United States Patent [19]

Nakano et al.

[11] 4,264,913
[45] Apr. 28, 1981

[54] ELECTRIC DISCHARGE RECORDING METHOD AND MATERIAL WITH NON-RECORDING LAYER

[75] Inventors: Shiro Nakano, Suita; Masaru Koike, Osaka, all of Japan

[73] Assignee: Sekisui Kagaku Kogyo Kabushiki Kaisha, Osaka, Japan

[21] Appl. No.: 14,153

[22] Filed: Feb. 22, 1979

Related U.S. Application Data

[62] Division of Ser. No. 813,776, Jul. 7, 1977, Pat. No. 4,163,075.

[30] Foreign Application Priority Data

| Jul. 8, 1976 | [JP] | Japan | 51/81513 |
| Jul. 8, 1976 | [JP] | Japan | 51/81514 |
| Jan. 12, 1977 | [JP] | Japan | 52/2658 |
| Mar. 9, 1977 | [JP] | Japan | 51/26361 |

[51] Int. Cl.$^3$ ............... G03G 15/048; G01D 15/08
[52] U.S. Cl. ........................... 346/162; 346/135.1
[58] Field of Search ............ 346/162, 163, 150, 135.1

[56] References Cited

U.S. PATENT DOCUMENTS

| 2,555,321 | 6/1951 | Dalton | 346/163 |
| 2,940,941 | 6/1960 | Dalton | 346/163 |
| 4,082,902 | 4/1978 | Suzuki | 346/135.1 |

Primary Examiner—Jay P. Lucas
Attorney, Agent, or Firm—Wenderoth, Lind & Ponack

[57] ABSTRACT

A method for performing electric discharge recording on the recording surface of an electric discharge recording material using a discharge recording stylus comprises interposing an electrically anisotropic non-recording layer between the recording surface and the discharge recording stylus. The non-recording layer is prepared by dispersing a metal powder in a resin matrix and has a surface resistance of at least $10^8$ ohms and a volume resistance of not more than $10^4$ ohms-cm. Electric discharge recording is performed through the non-recording layer. A composite discharge recording material comprises (a) an electric discharge-breakable semiconductive resin layer having a surface resistance of $10^5$ to $10^{16}$ ohms and a volume resistance of $10^3$ to $10^{14}$ ohms-cm, (b) a metal-containing resin layer having a surface resistance of at least $10^8$ ohms and a volume resistance of not more than $10^4$ ohms-cm, which is laminated on one surface of the semiconductive resin layer (a) and is prepared by dispersing a metal powder in a resin matrix and (c) a conductive layer laminated on the other surface of the semiconductive resin layer (a) and having a surface resistance of not more than $10^4$ ohms and a volume resistance of not than $10^2$ ohms-cm.

16 Claims, 2 Drawing Figures

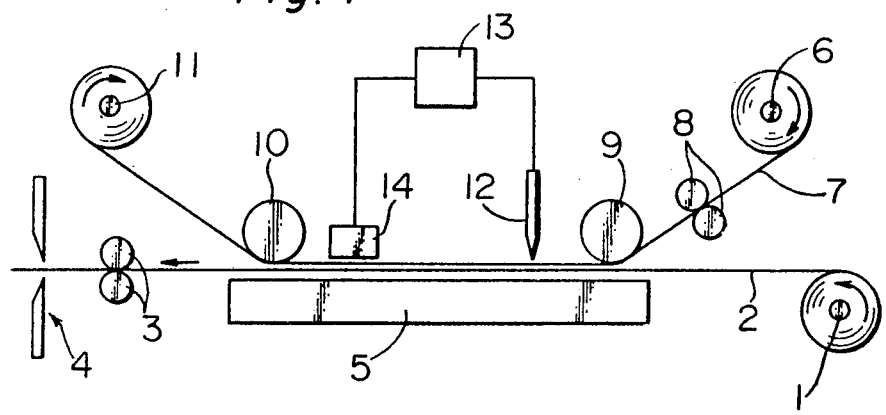
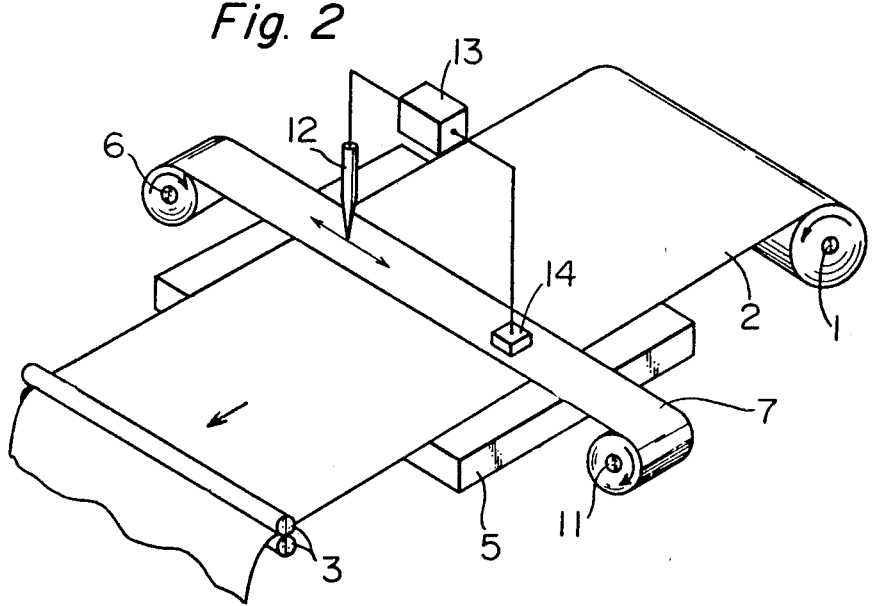

ELECTRIC DISCHARGE RECORDING METHOD AND MATERIAL WITH NON-RECORDING LAYER

This application is a division of application Ser. No. 813,776, filed July 7, 1977, now U.S. Pat. No. 4,163,075.

This invention relates to an improved method for electric discharge recording and a composite electric discharge recording material.

With abounding information in recent years, there has been an increased need for rapid transmission, recording, etc. of information, and various information control systems such as information processing systems, information transmission systems and information recording systems have been developed. An electric discharge recording system is one typical example.

The electric discharge recording system is a process which comprises applying an electrical signal of several hundred volts and several watts in the form of an electric voltage, and breaking a semiconductive recording layer on the surface of a recording layer by electric discharge, thereby to form an image on the recording layer or on a substrate superimposed on the recording layer. This process is a "direct imaging" process which does not require processing operations such as development and fixation, and is in widespread use as a simple recording process. For example, the process find applications in facsimile systems, various measuring instruments, recording meters, record displays in computers, and processing of electrostencil master sheets.

In the electric discharge recording, a discharge recording stylus is directly contacted with the recording surface of an electric discharge recording material. Discharging is performed through the stylus to break the recording layer, and to form an image on the recording surface. The electric discharge breakdown of the electric discharge recording material, however, causes the issuance of an offensive odor, the generation of soot, or scattering of a coloring substance such as carbon black dispersed in the recording layer.

The soot and carbon black will contaminate the recording material, or adhere to the discharge stylus to affect its accurate electric discharging. Consequently, this will reduce the reliability of recording. Furthermore, since the discharge recording stylus makes direct contact with the surface of the recording material for scanning, the injuries caused by the scanning track of the recording stylus remain on the surface of the recording material and its natural appearance is impaired.

In an attempt to remove such defects, there have been suggested a method involving the provision of a dust-collecting jacket around the tip of the discharge recording stylus as disclosed in Japanese Utility Model Publication No. 9851/65, and a method which uses a device for polishing and cleaning the discharge recording stylus as disclosed in Japanese Utility Model Publication No. 9850/65. These methods, however, cannot completely prevent the adhesion of soot, carbon black, etc. to the discharge recording stylus, and the maintenance of the devices is troublesome. A method was also suggested which involves the provision of a gas releasing device equipped with a filter containing a deodorant in an electric discharge recording device in order to remove the offensive odor. It is practically impossible with this method to remove the offensive odor completely, and the gas releasing device is costly.

In the course of their studies to improve the electric discharge system, the present inventors have found that a metal powder-containing resin sheet prepared by dispersing a certain metal powder in a resin matrix has a very high surface resistance in spite of its very low volume resistance, and therefore has anisotropy in electric conductivity permitting good conduction of an electric current in the thickness direction of the sheet but poor electric conduction in a direction at right angles to the thickness direction. It has also been found that when the resin sheet is placed on the recording surface of an ordinary discharge recording material and electric discharge recording is performed through it, the dissipation of an offensive odor and soot is shielded by the resin sheet and the scattering of carbon black is also prevented; covering of the recording surface with the metal-containing resin sheet does not reduce the accuracy of recording; and consequently, an image having a greater clearness, a natural appearance and a deep color of soft tone can be obtained.

It is an object of this invention to provide an electric discharge recording method which is free from the defects described hereinabove.

Another object of this invention is to provide a method for electric discharge recording which is free from troubles such as the issuance of an offensive odor, the contamination of a recording material or an electric discharge recording device by the scattering of soot and a coloring substance such as carbon black, and the reduction of the accuracy of electric discharge recording by the adhesion of soot or the coloring substance to the recording stylus.

Still another object of this invention is to provide a continuous and economical method for electric discharge recording.

A further object of this invention is to provide a method for electric discharge recording which gives a recorded image that is clear, natural in appearance, and of soft tone.

Yet another object of this invention is to provide a composite electric discharge recording material which does not give off an offensive odor nor scatter soot or a coloring substance such as carbon black during an electric discharge recording operation.

An additional object of this invention is to provide a composite electric discharge recording material which does not give off an offensive odor nor scatter soot or a coloring substance such as carbon black during an electric discharge recording operation, and gives a recorded image that is clear, natural in appearance, and of soft tone.

Other objects and advantages of the present invention will become apparent from the following description.

FIG. 1 is a schematic view of an example of the automated system for performing continuously the method of the present invention; and FIG. 2 is an outlined perspective view of another example of the automated system for performing continuously the method of the present invention.

According to this invention, there is provided an improved method for recording an image on the record surface of an electric discharge recording material using a discharge recording stylus, which comprises interposing an electrically anisotropic non-recording layer composed of a metal-containing resin prepared by dispersing a metal powder in a resin matrix and having a surface resistance of at least $10^8$ ohms and a volume resistance of not more than $10^4$ ohms-cm between the record surface and the discharge recording stylus, and performing electric discharge recording through the non-recording layer.

The greatest characteristic of the electric discharge recording method of this invention which is clearly distinguished from the conventional electric discharge recording methods is that the record surface of a discharge recording material is covered with a non-recording layer composed of an electrically anisotropic metal-containing resin, and electric discharge recording is performed on the record layer of the electric discharge recording material through the non-recording layer using a discharge recording stylus.

The metal-containing resin constituting the non-recording layer can be prepared by dispersing a metal powder in a resin matrix.

Any metal powder can be used which is electrically conductive and stable. Suitable metal powders are well conductive metal powders having a specific resistance of not more than $2 \times 10^{-4}$ ohm-cm, preferably not more than $2 \times 10^{-5}$ ohm-cm.

The metal powders include not only powders of metallic elements, but also powders of alloys of two or more metals and of products obtained by coating highly conductive metals with metal powders having low conductivity. Examples of suitable metal powders are metal elements such as copper, aluminum, tin, molybdenum, silver, iron, nickel and zinc, alloys of at least two metal elements such as stainless steel, brass and bronze, and a copper powder coated with silver. Of these, copper, aluminum, iron, zinc, and silver-coated copper powder are preferred. Copper, aluminum and zinc are most advantageous. The metal powders may be used alone or as mixtures of two or more.

It has been found that the particle diameter of the metal powder is one of the especially important factors for obtaining a metal-containing resin suitable for the objects of this invention. The suitable average particle diameter of the metal powder is 0.2 to 20 microns, preferably 0.5 to 10 microns, more preferably 1 to 6 microns.

The individual particles of the metal powder are generally preferably in the form of microspheres, dendrites or microlumps. Scale-like or needle-like particles well used in the field of paints can also be used in the present invention, but powders in these shapes are desirably used in combination with the microspherical, dendriform or microlumpy metal powders. From the standpoint of the method of powderization, electrolytic metal powders, pulverized electrolytic metal powders, stamp-milled metal powders, and reduced metal powders are advantageous.

It has been found quite unexpectedly that when a metal powder having the particle diameter and shape described above is dispersed in a resin and formed into a sheet for example, there is a marked difference in electric conductivity between the thickness direction of the sheet and a direction at right angles to the thickness direction, and the sheet has electric anisotropy and is very suitable as a covering sheet for electric discharge recording materials.

It is desirable that a metal-containing resin prepared by dispersing the metal powder in a resin matrix has a surface resistance of at least $10^8$ ohms, preferably $10^9$ to $10^{14}$ ohms, more preferably $5 \times 10^9$ to $5 \times 10^{12}$ ohms, and a volume resistance of not more than $10^4$ ohms-cm, preferably 1 to $10^4$ ohms-cm, more preferably $10^2$ to $10^3$ ohms-cm.

In the present application, the "surface resistance" is defined in "5.3" under "Definitions" at page 93 of ASTM designation: D-257 (reapproved 1972), and it is measured by the device shown in FIG. 2 at page 102.

The "volume resistance" is defined in "5.2" under "Definitions" at page 93 of ASTM designation: D-257, and it is measured by the device shown in FIG. 4 at page 104.

The metal powder can be dispersed in a resin in an amount which makes it possible for the resulting metal-containing resin to have the above-specified surface resistance and volume resistance. The amount of the metal powder can therefore be varied widely according to the type, particle diameter, shape, etc. of the metal. Generally, the amount of the metal powder is at least 20 parts by weight, preferably 30 to 2,000 parts by weight, more preferably 40 to 1,000 parts by weight, per 100 parts by weight of the resin.

The resin which constitutes the resin matrix in which the metal powder is dispersed may be any thermoplastic or thermosetting resin which has film-forming ability and electrical insulation (generally having a volume resistance of at least $10^7$ ohms-m). Generally, the matrix resin preferably has a great ability to bind the metal powder and can be formed into sheets or films having high mechanical strength, flexibility and high stiffness.

Examples of suitable resins that can be used in this invention are thermoplastic resins such as polyolefins (such as polyethylene or polypropylene), polyvinyl chloride, polyvinyl acetal, cellulose acetate, polyvinyl acetate, polystyrene, polymethyl acrylate, polymethyl methacrylate, polyacrylonitrile, thermoplastic polyesters, polyvinyl alcohol, and gelatin; and thermosetting resins such as thermosetting polyesters, epoxy resins, and melamine resins. The thermoplastic resins are preferred, and polyethylene, polyvinyl acetal, cellulose acetate, thermoplastic polyesters, and polyvinyl chloride are especially preferred.

As is conventional in the art, additives such as plasticizers, fillers, lubricants, stabilizers, antioxidants or mold releasing agents may be added as needed to the resin in order to improve its moldability, storage stability, plasticity, tackiness, lubricity, etc.

Examples of the plasticizers are dioctyl phthalate, dibutyl phthalate, dicapryl phthalate, dioctyl adipate, diisobutyl adipate, triethylene glycol di(2-ethyl butyrate), dibutyl sebacate, dioctyl azelate, and triethylhexyl phosphate, which are generally used as plasticizers for resins. The amount of the plasticizer can be varied over a wide range according, for example, to the type of the resin and the type of the plasticizer. Generally, its amount is at most 150 parts by weight, preferably up to 100 parts by weight, per 100 parts by weight of the resin. The optimum amount of the plasticizer is not more than 80 parts by weight per 100 parts by weight of the resin.

Examples of fillers are fine powders of calcium oxide, magnesium oxide, sodium carbonate, potassium carbonate, strontium carbonate, zinc oxide, titanium oxide, barium sulfate, lithopone, basic magnesium carbonate, calcium carbonate, silica, and kaolin. They may be used either alone or as mixtures of two or more.

The amount of the filler is not critical, and can be varied over a wide range according to the type of the resin, the type of the filler, etc. Generally, the amount is up to 1000 parts by weight, preferably not more than 500 parts by weight, more preferably up to 200 parts by weight.

The non-recording layer composed of the metal-containing resin having the aforementioned composition may be laminated on the record surface of an electric discharge recording material as a bonded layer, or a separated independent layer to be superimposed in a film or sheet form on the record surface of the recording material. The thickness of the non-recording layer is not critical, and can be varied over a wide range. Generally, the thickness is preferably at least 3 microns. If the thickness of the non-recording layer is too large, the amount of electricity consumed increases. Hence, the thickness of the non-record layer is advantageously less than about 100 microns, usually 5 to 60 microns. More advantageously, satisfactory improving effects can be obtained with a thickness of about 10 to 40 microns.

The metal-containing resin can be applied directly to the recording surface of an electric discharge recording material in the form of a solution or suspension in a solvent capable of dissolving the resin, for example ketones such as cyclohexanone or acetone, alcohols such as ethyl alcohol or propyl alcohol, ethers such as tetrahydrofuran or dioxane, halogenated hydrocarbons such as tetrachloroethane or chlorobenzene, dimethyl formamide, or water. Or it may also be applied as a melt. Alternatively the metal-containing resin may be formed into a sheet or film by known methods such as melt extrusion, solution casting, emulsion casting, or calendering, and bonded to, or merely superimposed on, the record surface of an electric discharge recording material.

In the preparation of a metal-containing resin sheet or film, the amount of a metal powder required to achieve the desired volume resistance differs according to the method of fabrication. For example, when the film or sheet is fabricated by casting, the amount of the metal per 100 parts by weight of the resin is 30 to 80 parts by weight for aluminum, 80 to 200 parts by weight for copper, 100 to 200 parts by weight for iron, and 250 to 600 parts by weight for zinc. In melt-shaping using a roll, the suitable amount of the metal is 200 to 6:0 parts by weight for copper, and 400 to 800 parts by weight for zinc, per 100 parts by weight of the resin.

The electrical discharge recording method of this invention is known except the use of the non-recording layer described above, and can be applied to any type of electric discharge recording material capable of permitting recording by utilizing electric discharge breakdown by an electric discharge recording stylus. For example, it can be applied successfully to the electric discharge recording materials disclosed in U.S. Pat. No. 2,664,043, Japanese Patent Publications Nos. 14031/76, 8200/67 and 28080/70, and Japanese Laid-Open Patent Publications Nos. 20833/76 and 102643/73.

Some typical structures of electric discharge recording materials that can be used in this invention especially suitably are shown below.

(i) An electric discharge recording material consisting of a conductive base sheet (b) containing 30 to 40% by weight of carbon black, a semiconductive recording layer (c) having a thickness of about 10 microns and formed on the surface of the conductive base sheet (b) by applying a white pigment of a metal oxide such as titanium oxide, reduced titanium oxide or zinc oxide using a binder such as gelatin or a vinyl resin, and a layer of a fine aluminum powder (a) formed on the back surface of the base sheet (b) for prevention of soiling of hands and other objects. Also available is a modification of this electric discharge recording material in which a semiconductive recording layer is also provided on the back surface instead of the layer (a).

(ii) An electric discharge recording material consisting of an ordinary sheet of paper (a), a conductive layer (b) containing carbon black formed on the surface of the paper (a) to a thickness of about 10 to 30 microns, and a semiconductive recording layer, similar to (c) in (i) above, formed on the surface of the layer (b).

(iii) An electric discharge recording material consisting of an ordinary sheet of paper (a), an insulating black layer (b) of carbon black or a dye, a thin layer (c) of aluminum vacuum-deposited on the layer (b) to a thickness of about 600 to 1000 Å, and a semiconductive recording layer (d) of zinc oxide formed on the surface of the layer (c). High whiteness can be achieved with a very thin (several microns) surface recording layer (d) since the black insulating layer is covered with a thin film of aluminum and the aluminum layer has a high optical reflection.

The color-forming mechanism of these electric discharge recording materials involves the following factors.

(1) The surface recording layer is removed partly or wholly according to the magnitudes of recording voltage and current to reveal the black layer.

(2) The surface recording layer is partly or wholly metal-reduced or decomposed according to the magnitudes of recording voltage and current and thus changed to a blackened product.

(3) Since the carbon black in the carbon black layer has an electric charge, it is electronically drawn toward the recording electrode and migrates to the surface.

Recording results in a permanent recorded image in a moment, and halftone recording can also be achieved.

According to the present invention, the non-recording layer composed of a metal-containing resin is applied to the record surface of an electric discharge recording material, and electric discharge recording can be performed by the scanning operation of a discharge recording stylus through the non-recording layer.

The electric discharge recording operation can be performed in a conventional manner, and its details are omitted in this specification.

In performing electric discharge recording, especially in continuous electric discharge recording, it is the frequent practice to move the electric discharge recording material in a direction at right angles to the scanning direction of the discharge recording stylus.

This method of continuous electric discharge recording while moving the electric discharge recording material can also be used in the present invention. According to one embodiment of this invention, it is possible to superimpose the non-recording layer as a separate film or sheet on the electric discharge recording material, and perform electric discharge recording while moving the electric discharge recording material and the non-recording film or sheet in the same direction. At this time, the moving speed of the electric discharge recording material can be made larger than that of the non-recording sheet. There is no strict restriction on the relative moving speeds of the electric discharge recording material and the non-recording sheet. It is desirable, however, that the moving speed of the electric discharge recording material does not exceed 1,000 times the moving speed of the non-recording sheet. Usually, it is 5 to 500 times the moving speed of the non-recording sheet, preferably about 10 to 50 times for practical purposes.

One specific procedure for performing electric discharge recording while moving the electric discharge recording material and the non-recording sheet in the same direction at different speeds is shown in FIG. 1 of the accompanying drawings.

Referring to FIG. 1, an electric discharge recording material 2 and a metal powder-containing resin film or sheet 7 are delivered simultaneously toward a support plate 5 for an electric discharge recording device from a feed roll 1 and a feed roll 6 disposed above and in parallel to the feed roll 1. On the support plate 5, the record surface of the electric discharge recording material 2 is covered with the film or sheet 7. A discharge recording stylus 12 provided in the discharge recording device and a return electrode 14 are caused to abut the supplied sheet or film 7 on the support plate 5. An electrical signal corresponding to the desired image is sent to the discharge recording stylus 12 from a recording electric source 13, and discharged while scanning the sheet by the discharge recording stylus 12. Thus, the recording layer of the electric discharge recording material 2 is broken through the metal powder-containing resin film or sheet 7 to perform electric discharge recording on the electric discharge recording material 2. The electric discharge recording material 2 on which recording has thus been performed is taken up by a pair of guide rolls 3 and cut to the required lengths by a cutter 4. The recorded material is then collected.

In the meantime, the resin film or sheet 7 can be taken up on a wind-up roll 11 through a guide roll 10. In the above procedure, the relative moving speeds of the electric discharge recording material 2 and the metal powder-containing resin film or sheet 7 can be freely changed on the support plate 5 by adjusting the take-up speed of the electric discharge recording material 2 by the guide rolls 3 and the wind-up speed of the film or sheet 7 by the wind-up roll 11.

According to another embodiment of the present invention in the continuous electric discharge recording while moving an electric discharge recording material, electric discharge recording can be performed while moving the non-recording layer in a direction different from the moving direction of the electric discharge recording material. The non-recording layer can be moved at any desired angle to the moving direction of the electric discharge recording material, but preferably, the moving direction of the non-recording layer is at right angles to the moving direction of the electric discharge recording material. The moving speed of the non-recording layer can be made faster than moving speed of the electric discharge recording material. Generally, it is advantageous that the speed of the non-recording layer is not more than 100 times the moving speed of the electric discharge recording material, preferably 10 to 50 times, more preferably 2 to 20 times, the speed of the electric discharge recording material.

A specific procedure for performing electric discharge recording while moving the non-recording layer in a direction at right angles to the electric discharge recording material is shown in FIG. 2.

Referring to FIG. 2, an electric discharge recording material 2 is moved from a feed roll 1 to a pair of guide rolls 3 through a support plate 5 of an electric discharge recording device. In the meantime, a metal powder-containing resin film or sheet 7 in tape form is delivered from a feed roll 6 provided laterally of the support plate 5 at right angles to the moving direction of the electric discharge recording material 2 so that the film or sheet 7 is superimposed on the recording surface of the electric discharge recording material 2 and crosses it at right angles to it. The film or sheet 7 is finally wound up on a wind-up roll 11. A discharge recording stylus 12 and a return electrode 14 are caused to move about the surface of the film or sheet 7 on the support plate 5. An electrical signal corresponding to the desired image is sent from a recording electric source 13, and applied to the electric discharge recording material 2 through the film or sheet 7 to perform electric discharge recording on the electric discharge recording material 2.

As stated, the method of this invention is essentially characterized by the fact that electric discharge recording is performed on an electric discharge recording material through a non-recording layer of a metal powder-containing resin superimposed or coated on the recording surface of the recording material. Since the non-recording layer composed of a metal powder-containing resin has unique electrical anisotropy, electricity discharged through the non-recording layer by a discharge recording stylus does not break the non-recording layer but breaks only that portion of the electric discharge recording material which is immediately beneath the recording stylus.

Since according to the method of this invention, the surface of the electric discharge recording material is covered by the non-recording layer which will not be broken by discharge, an offensive odor generated at the time of electric discharge recording does not dissipate, and the scattering of soot and a coloring agent such as carbon black is completely prevented. Hence, environmental pollution by the offensive odor, soot, and coloring substances can be controlled, and the contamination of the discharge recording stylus can also be inhibited. This greatly reduces the trouble of inspecting and maintaining the discharge recording stylus. Moreover, the method of this invention can achieve clear recording of high reliability.

Since the recording stylus does not directly contact the surface of the electric discharge recording material, the method of the invention has the advantage that no injury by the scanning track of the recording stylus occurs on the surface of the electric discharge recording material.

By utilizing the above advantages obtained by using the non-recording layer consisting of a metal powder-containing resin, the present invention, in a preferred aspect, provides a composite electric discharge recording material comprising (a) a semiconductive resin layer capable of being broken by electric discharging which has a surface resistance of $10^5$ to $10^{16}$ ohms and a volume resistance of $10^3$ to $10^4$ ohms-cm;

(b) a metal-containing resin layer having a surface resistance of at least $10^8$ ohms and a volume resistance of not more than $10^4$ ohms-cm, which is laminated on one surface of the semiconductive resin layer (a) and is prepared by dispersing a metal powder in a resin matrix; and (c) a conductive layer having a surface resistance of not more than $10^4$ ohms and a volume resistance of not more than $10^2$ ohms-cm, which is laminated on the other surface of the semiconductive resin layer (a).

The composite electric discharge recording material provided by the present invention is a novel three-layered electric discharge recording material obtained by laminating the non-recording layer (b) of a metal powder-containing resin in accordance with this invention on the surface of a semiconductive resin layer (a) of an electric discharge recording material consisting of the semiconductive resin layer (a) and the conductive layer (c).

The metal powder-containing resin layer (b) is the same as that described hereinabove. Its thickness is not critical, and can be varied widely. Usually its thickness is at least 3 microns. The upper limit of the thickness is neither strict, but is advantageously set at 100 microns for the reason stated above. Preferably, the thickness is 5 to 60 microns, more preferably 10 to 40 microns.

The semiconductive resin layer (a) laminated on the metal powder-containing resin layer is broken by discharging. It has a surface resistance of $10^5$ to $10^{16}$ ohms, preferably $10^7$ to $10^{15}$ ohms, more preferably $10^9$ to $10^{13}$ ohms and a volume resistance of $10^3$ to $10^{14}$ ohms-cm, preferably $10^4$ to $10^{13}$ ohms-cm, more preferably $10^5$ to $10^{11}$ ohms-cm.

The semiconductive resin layer (a) can be formed by dispersing a conductivity-imparting agent in a resin matrix.

The resin matrix forming a substrate for the semiconductive resin layer (a) may be chosen from those which have been described hereinabove about the non-recording layer composed of a metal powder-containing resin. The thermoplastic resins are especially suitable, and polyethylene, cellulose actate and polyvinyl acetal are used advantageously. As needed, the resin may contain additives of the types described hereinabove such as plasticizers and fillers in the amounts described.

When a filler having a different conductivity from the conductivity-imparting agent, generally having a lower conductivity than the conductivity-imparting agent, is included in the semiconductive resin layer (a), the breakdown of the semiconductive resin layer (a) by electric discharging occurs more sharply, and a recorded image which is clearer and has a higher contrast can be obtained. Suitable fillers of this kind are fine powders of inorganic substances such as magnesium oxide, calcium oxide, sodium carbonate, potassium carbonate, strontium carbonate, titanium oxide, barium sulfate, lithopone, basic magnesium carbonate, calcium carbonate, silica, kaolin clay, and zinc oxide. They can be used singly or as a mixture of two or more. Of these, titanium oxide and calcium carbonate are especially suitable. The average particle diameter of the filler is generally 10 microns at most, preferably not more than 5 microns, more preferably 2 to 0.1 microns. The amount of the filler can be varied over a wide range according to the type of the resin, etc. The suitable amount is generally 10 to 2,000 parts by weight, preferably 20 to 1,000 parts by weight, more preferably 50 to 400 parts by weight, per 100 parts by weight of the resin.

The conductivity-imparting agent to be dispersed in the resin to impart semiconductivity may be any material which has conductivity and gives the surface resistance and volume resistance described above to the resin layer. Generally, suitable conductivity-imparting agents have a specific resistance, measured under a pressure of 50 kg/cm$^2$, of not more than $10^6$ ohms-cm. Examples of such a conductivity-imparting agent include carbon blacks; metals such as gold, silver, nickel, molybdenum, copper, aluminum, iron and conductive zinc oxide (zinc oxide doped with 0.03 to 2.0% by weight, preferably 0.05 to 1.0% by weight, based on the zinc oxide, of a different metal such as aluminum, gallium, germanium, indium, tin, antimony or iron); conductive metal-containing compounds such as cuprous iodide, stannic oxide, and metastannic acid; and zeolites. Of these, carbon blacks, silver, nickel, cuprous iodide, conductive zinc oxide are preferred, and carbon blacks and conductive zinc oxide are more preferred. The carbon blacks which also act as a coloring agent are most preferred.

Carbon blacks differ somewhat in conductivity according to the method of production. Generally, acetylene black, furnace black, channel black, and thermal black can be used.

The conductivity-imparting agent is dispersed usually in the form of a fine powder in the resin. The average particle diameter of the conductivity-imparting agent is 10 microns at most, preferably not more than 5 microns, especially preferably 2 to 0.005 microns. When a metal powder is used as the conductivity-imparting agent, it is preferably in a microspherical, dendric or microlumpy form. Moreover, since a resin sheet having the metal powder dispersed therein tends to be electrically anisotropic if its particle diameter exceeds 0.2 micron, Hence, the particle size of a metal powder in the above-mentioned form to be used as a conductivity-imparting agent for the semiconductive resin layer (a) or the conductive layer (c) should be at most 0.5 micron, preferably not more than 0.2 micron, more preferably 0.15 to 0.04 micron. Scale-like or needle-like powders can also be used, but should be combined with powders of the above forms.

The amount of the conductivity-imparting agent to be added to the resin can be varied over a very wide range according to the conductivity of the conductivity-imparting agent, etc. The amount is the one sufficient to adjust the surface resistance and volume resistance of the semiconductive resin layer (a) to the above-mentioned ranges. For example, carbon blacks are incorporated generally in an amount of 1 to 300 parts by weight, preferably 2 to 200 parts by weight, more preferably 3 to 150 parts by weight, per 100 parts by weight of the resin. The other conductivity-imparting agents are used generally in an amount of 3 to 500 parts by weight, preferably 5 to 400 parts by weight, more preferably 10 to 300 parts by weight, per 100 parts by weight of the resin.

The thickness of the semiconductive resin layer (a) is not critical, and can be varied over a wide range according to the uses of the final product, etc. Generally, its thickness is at least 2 microns, preferably 3 to 50 microns, more preferably 5 to 20 microns.

According to the present invention, the conductive layer (c) is laminated on the other surface of the semiconductive resin layer (a).

The conductive layer (c) plays an important role in performing electric discharge breakdown with high accuracy by converging the current flowing through the semiconductive resin layer at a point immediately downward of the electric discharge recording stylus. The conductive layer (c) has a surface resistance of not more than $10^4$ ohms, preferably not more than $5 \times 10^3$ ohms, more preferably $10^{-1}$ to $2 \times 10^3$ ohms and a volume resistance of not more than $10^2$ ohms-cm, preferably not more than 50 ohms-cm, more preferably not more than 20 ohms-cm.

The conductive layer (c) having such resistance characteristics may be a conductive resin layer comprising a thermoplastic or thermosetting resin and a conductivity-imparting agent dispersed in it, a vacuum-deposited metal layer, or a metal foil layer.

The thermoplastic or thermosetting resin that can be used in the conductive resin layer can also be selected from those described hereinabove in connection with recording layer. Of these, the thermoplastic resins, especially polyethylene, cellulose acetate and polyvinyl acetal, are used advantageously. The conductivity-imparting agent to be dispersed in the resin may be chosen from those described above in connection with the semiconductive resin layer. Carbon blacks and metal powders are especially suitable.

The conductivity-imparting agents are added in amounts which will cause the resin layer to have the electrical resistance characteristics described above. The amounts vary greatly according to the type of the conductivity-imparting agent. For example, carbon blacks are used in an amount of generally at least 10 parts by weight, preferably 20 to 200 parts by weight, more preferably 30 to 100 parts by weight; the other conductivity-imparting agents, especially metal powders, are used in an amount of at least 50 parts by weight, preferably 100 to 600 parts by weight, more preferably 150 to 400 parts by weight, both per 100 parts by weight of the resin.

As needed, the conductive resin layer may contain the aforesaid additives such as plasticizers and fillers in the amounts stated.

The thickness of the conductive resin layer is not critical, and can be varied widely according to the uses of the final products, etc. Generally, it is at least 3 microns, preferably 3 to 50 microns, more preferably 5 to 20 microns.

The conductive layer (c) may be a vacuum-deposited metal layer. Specific examples of the metal are aluminum, zinc, copper, silver and gold. Of these, aluminum is most suitable.

The thickness of the vacuum-deposited metal layer is neither restricted strictly. Generally, it is at least 4 millimicrons, preferably 10 to 300 millimicrons, more preferably 20 to 100 millimicrons. By an ordinary vacuum-depositing method for metal, it can be applied to one surface of the semiconductive resin layer (a).

The conductive layer (c) may also be a thin metal foil, for example an aluminum foil. It can be applied to one surface of the semiconductive resin layer (a) by such means as bonding or plating.

When the composite discharge recording material is intended for use in electric discharge transfer recording, at least one of the semiconductive resin layer (a) and the conductive resin layer (c) may contain a coloring substance. Useful coloring substances are carbon blacks, inorganic or organic pigments, and dyes.

Carbon black has superior conductivity and acts both as a coloring substance and a conductivity-imparting agent as stated above. Thus, when the semiconductive resin layer or the conductive resin layer already contains carbon black as a conductivity-imparting agent, it is not necessary to add a further coloring substance. The inclusion of other suitable coloring substance is of course permissible.

Examples of pigments other than carbon black include inorganic pigments such as nickel yellow, titanium yellow, cadmium yellow, zinc yellow, ochre, cadmium red, prussian blue, ultramarine blue, zinc white, lead sulfate, lithopone, titanium oxide, black iron oxide, chrome orange, chrome vermilion, red iron oxide, red lead and vermilion; and organic pigments of the phthalocyanine, quinacridone and benzidine series such as aniline black, naphthol yellow S, hanza yellow 10G, benzidine yellow, permanent yellow, Permanent Orange, Benzidine Orange G, Indanthrene Brilliant Orange GK, Permanent Red 4R, Brillant Fast Scarlet, Permanent Red F2R, Lake Red C, Cinquasia Red Y (Dup) (C.I. 46500), Permanent Pink E (FH) [Quido Magenta RV 6803 (HAR)], and Phthalocyanine Blue (C.I. Pigment Blue 15).

Examples of useful dyes are azoic dyes, anthraquinonic dyes, thionidigo dyes, quinoline dyes, and indanthrene dyes.

The pigments and dyes described are used either alone or in combination according to the color desired to be formed on a transfer recording sheet.

The amount of the pigment or dye can be varied over a wide range according to the type, color intensity, etc. of the coloring substance. Generally, it is at least 1 part by weight, preferably 2 to 1,000 parts by weight, more preferably 3 to 500 parts by weight, per 100 parts by weight of the resin.

When the pigment or dye is to be incorporated in both of the semiconductive resin layer (a) and the conductive resin layer (c), it is desirable that pigments or dyes be of an identical color or have colors of the same series.

The composite electric discharge recording material of this invention can be formed by known methods, for example a melt-extrusion method, a melt-coating method, a melt-calendering method, a solution casting method, an emulsion casting method or combinations of these methods.

The composite electric discharge recording material of this invention described above is useful as an electric discharge transfer recording material or an electric stencil master sheet.

For use as an electric discharge transfer recording material, a consolidated laminate composed of the semiconductive resin layer (a), the metal powder-containing resin layer (b) and the conductive layer (c) is formed, and superimposed on a recording sheet for electric discharge transfer recording such as a pulp paper, a synthetic paper-like sheet or a plastic sheet so that the conductive layer (c) contacts the recording sheet. When electric discharge recording is performed by a discharge recording stylus in accordance with an ordinary method from the side of the metal powder-containing resin layer (b), the semiconductive resin layer (a) and the conductive layer (c) are simultaneously broken by electric discharging, and the broken pieces are transferred to the record sheet and fixed there, thereby achieving transfer recording.

Transfer recording using this composite electric discharge recording material can be easily performed continuously and in an automated system. For example, if in the processes shown in FIGS. 1 and 2, a recording sheet is used instead of the electric discharge recording material 2 and the composite electric discharge recording material of this invention is used instead of the metal-powder-containing resin sheet 7, the electric discharge transfer recording can be performed continuously by the same operation as described hereinabove.

In the process shown in FIG. 1, the moving speed of the record sheet 2 can be not more than 100 times, preferably 1.5 to 50 times, more preferably 2 to 20 times, the moving speed of the composite electric discharge recording material 7. In the process shown in FIG. 2, the moving speed of the composite electric discharge recording material 7 is conveniently not more than 100 times, preferably 1.5 to 50 times, more preferably 2 to 20 times, the moving speed of the recording sheet 2.

In the embodiment shown in FIG. 2, the composite electric discharge recording material of this invention can be used in a narrow tape form such as a typewriter ribbon.

Needless to say, the composite electric discharge recording material of this invention can be processed to any desired width or length according to its use.

The composite electric discharge recording material of this invention can also be used as an electrostencil master sheet. In this case, the semiconductive resin layer (a) and the conductive layer (c) are formed in a unitary laminate structure, and the metal powder-containing resin layer (b) is strippably laminated by its own tackiness or by the aid of a temporary adhesive to that surface of the semiconductive resin layer (a) which is opposite to the surface on which the conductive layer (c) is laminated. When electric discharge breaking is performed in accordance with a customary manner from the surface of the metal powder-containing resin layer (b), a pattern is correspondingly cut in the laminate of the semiconductive resin layer (a) and the conductive layer (c). After the end of electric discharge recording, the metal powder-containing resin layer (b) is removed from the composite electric discharge recording material, and a sheet consisting of the laminate of the semiconductive resin layer (a) and the conductive layer (c) can be utilized as a master sheet for duplication.

In electric discharge recording, the semiconductive resin layer and the conductive layer of the composite electric discharge recording material are broken down, but the metal powder-containing resin layer is not broken because of its electric anisotropy and remains substantially unchanged. Accordingly, the dissipation of the offensive odor issued at the time of electric discharge breakdown is inhibited, and soot or a coloring substance such as carbon black is prevented from scattering and adhering to the discharge recording stylus. The troublesome inspection and maintenance of the discharge recording stylus can be markedly reduced, and recording can be performed with high reliability.

The use of the composite electric discharge recording material can afford a sharp recorded image, and in electric discharge transfer recording, a transfer recorded image having a high density, a natural appearance and a soft tone can be obtained.

The composite electric discharge recording material of this invention can be used a plurality of times.

The composite electric discharge recording material of this invention can be conveniently used in facsimile systems, terminal recording devices in electronic computers, automatic recording devices of automatic measuring instruments, and various types of printers, etc.

The following Examples illustrate the present invention is more detail. All parts and percentages are by weight unless otherwise specified.

EXAMPLE 1

| | |
|---|---|
| Cellulose acetate (degree of polymerization 140; degree of acetylation 55%) | 100 parts |
| Electrolytic copper powder (average particle diameter 2 microns) | 100 parts |
| Acetone | 500 parts |

The ingredients in accordance with the above formulation were dispersed. The dispersion was cast on a glass sheet and dried to afford a metal powder-containing resin sheet having a thickness of 20 microns. The resin sheet had a surface resistance of $1.2 \times 10^{11}$ ohms, and a volume resistance of $1.6 \times 10^2$ ohms-cm.

The surface of an electrostencil master sheet (Tomy Echo, a trademark for a product of Tomoegawa Paper Mfg. Co., Ltd.) was covered with the resin sheet, and the stencil sheet was processed by an automatic electrostencil master processing machine (Gestetner 1100, a trademark for a product of Gestetner Limited). Scarcely any offensive odor was perceived, and there was no scattering of soot or carbon black. Moreover, no penetration hole formed in the resin sheet.

Printing was performed by a printing press (Gestetner 420 W, a trademark for a product of Gastetner Limited) using the processed electrostencil master sheet. Good printed copies having a resolution of 6 lines/mm were obtained.

When processing was performed 10 times using the above resin sheet, the resin sheet did not change both in appearance and effect.

EXAMPLE 2

| | |
|---|---|
| Vinyl butyral resin (degree) of polymerization 1,700; degree of butyralization 66%) | 100 parts |
| Pulverized aluminum powder (average particle diameter 2 microns) | 50 parts |
| Ethyl alcohol | 100 parts |

A metal-containing resin sheet having a thickness of 10 microns was prepared in the same way as in Example 1 from a dispersion of the ingredients in the above formulation. The resin sheet had a surface resistance of $5 \times 10^{11}$ ohms and a volume resistance of $5.1 \times 10^3$ ohms-cm. Using the resin sheet, an electrostencil master sheet was processed in the same way as in Example 1. Scarcely any offensive odor was perceived, and there was no scattering of soot or carbon black. No penetration hole formed in the resin sheet.

Printing was performed in the same way as in Example 1 using the processed electrostencil master sheet. Good printed copies having a resolution of 5 lines/mm were obtained.

EXAMPLE 3

| | |
|---|---|
| Vinyl butyral resin (degree of polymerization 1,700; degree of butyralization 66%) | 100 parts |
| Stamp-milled tin powder (average particle diameter 2 microns) | 300 parts |
| Ethyl alcohol | 1000 parts |

A metal-containing resin sheet having a thickness of 20 microns was prepared in the same manner as in Example 1 from a dispersion of the ingredients in accordance with the above formulation. The resin sheet had a surface resistance of $0.8 \times 10^9$ ohms and a volume resistance of $2.2 \times 10^2$ ohms-cm. An electrostencil master sheet was processed in the same way as in Example 1 using the resulting resin sheet. Scarcely any offensive odor was perceived, and there was no scattering of soot or carbon black. No penetration hole formed in the resin sheet.

Printing was performed in the same way as in Example 1 using the processed electrostencil master sheet. Good printed copies having a resolution of 5 lines/mm were obtained.

EXAMPLE 4

| Vinyl acetal resin (degree of polymerization 1,750; degree of acetalization 67%) | 100 parts |
| --- | --- |
| Electrolytic copper powder (average particle diameter 2 microns) | 100 parts |
| Ethyl alcohol | 1000 parts |

A metal powder-containing resin sheet having a thickness of 25 microns was prepared in the same way as in Example 1 from a dispersion of the ingredients in accordance with the above formulation. The resin sheet had a surface resistance of $1.2 \times 10^{11}$ ohms and a volume resistance of $1.6 \times 10^2$ ohms-cm.

The surface of an electrostencil master sheet (Gestefax 200, a trademark for a product of Gestetner Limited) was covered with the resin sheet, and a transparent polystyrene sheet having a thickness of 100 microns was superimposed on the back of the electrostencil master sheet. The electrostencil master sheet was processed by an automatic electrostencil master processing machine (Gestetner 1100, at trademark for a product of Gestetner Limited). Scarcely any offensive odor was perceived, and there was no scattering of soot or carbon black. No penetration hole formed in the resin sheet.

The electrostencil master sheet could be well processed, and a clear image was obtained on the transparent polystyrene sheet. The resulting product could be used as a sheet for an overhead projector.

When the same operation was repeated using plain paper instead of the polystyrene sheet, good copies were obtained.

EXAMPLE 5

| Vinyl chloride resin (degree of polymerization 1200) | 100 parts |
| --- | --- |
| Electrolytic copper powder (average particle diameter 2 microns) | 100 parts |
| Tetrahydrofuran | 1000 parts |

A metal powder-containing resin sheet having a thickness of 15 microns was prepared in the same way as in Example 1 from a dispersion of the ingredients shown above. The resin sheet had a surface resistance of $5.1 \times 10^{11}$ ohms and a volume resistance of $2.1 \times 10^2$ ohms-cm. When an electrostencil master sheet was processed in the same way as in Example 1 using the resulting resin sheet, scarcely any offensive odor was perceived, and there was no scattering of soot or carbon black. No penetration hole formed in the resin sheet.

Printing was performed in the same way as in Example 1 using the processed electrostencil master sheet. Good printed copies having a resolution of 6 lines/mm were obtained.

EXAMPLE 6

| Vinyl acetal resin (degree of polymerization 1,750; degree of acetalization 67%) | 100 parts |
| --- | --- |
| Electrolytic copper powder coated with silver (average particle diameter 2 microns) | 100 parts |
| Ethyl alcohol | 1000 parts |

A metal powder-containing resin sheet having a thickness of 18 microns was prepared in the same way as in Example 1 from a dispersion of the ingredients shown above. The resin sheet had a surface resistance of $3.0 \times 10^{11}$ ohms and a volume resistance of $1.9 \times 10^2$ ohms-cm. The surface of an electric discharge recording sheet (Tomy Echo, a trademark for a product of Tomoegawa Paper Mfg. Co., Ltd.) was covered with the resin sheet, and recording was performed by a facsimile receiver (PANAFAX 1000D, a trademark for a product of Matsushita Denso Kiki Kabushiki Kaisha) at a scanning density of 4 lines/mm. Scarcely any offensive odor was perceived, and there was no scattering of soot or carbon black. Very good recorded images were obtained. The electric discharge recording sheet was free from any injury of the scanning track of the recording stylus.

The recorded image had an optical reflection density of 0.66, and a resolution of 4 lines/mm.

The resin sheet was positioned on the surface of the electric discharge recording sheet in a manner to cover it. Electric discharge recording was performed under the same conditions as in the electric discharge recording described above while delivering the electric discharge recording sheet at a rate of 60 mm/min. and the resin sheet at a rate of 6 mm/min. No scattering of soot or carbon black occurred to adhere to the recording stylus, and no penetration hole formed in the resin sheet. A clear recorded image was obtained on the electric discharge recording sheet. The resulting image had a reflection density of 0.65 and a resolution of 4 lines/mm.

The resin sheet and the electric discharge recording sheet were delivered at a rate of 120 mm/min. and 60 mm/min. respectively in a manner such that they crossed each other at right angles, and the resin sheet covered the surface of the electric discharge recording. Electric discharge recording was performed under the same conditions as in the electric discharge recording described above. No scattering of soot or carbon black occurred to adhere to the recording stylus, and no penetration hole formed in the resin sheet. The electric discharge recording proceeded in good condition, and a clear recorded image was obtained on the electric discharge recording sheet. The resulting image had a reflection density of 0.62 and a resolution of 4 lines/mm.

EXAMPLE 7

A composition having each of the formulations shown in Table 1 was fed to a roll mill at 160° C., and kneaded for 5 minutes to afford a metal powder-containing resin sheet having a thickness of 15 to 30 microns. The resin sheets obtained had the surface resistances and volume resistances shown in Table 1.

The resulting metal powder-containing resin sheet was placed on the surface of the same electric discharge recording sheet as used in Example 6, and electric discharge recording was performed at a scanning density of 4 lines/mm in the same facsimile receiver as used in Example 6. Scarcely any offensive odor was preceived, and there was no scattering of soot or carbon black. A very good recorded image was obtained, and the electric discharge recording sheet was free from an injury of the scanning track of the recording stylus.

The reflection densities and resolutions of the resulting recorded images are shown in Table 1.

TABLE 1

| Run No. | 1 | 2 | 3 |
|---|---|---|---|
| Composition |  |  |  |
| Ethylene resin | 100 | — | 100 |
| Vinyl chloride resin (degree of polymerization 1,200) | — | 100 | — |
| Electrolytic copper powder (average particle diameter 2 microns) | 400 | 340 | — |
| Zinc powder (average particle diameter 5 microns) | — | — | 550 |
| Dioctyl phthalate | — | 30 | — |
| Stabilizer* | 1 | 3 | 1 |
| Surface resistance (ohms) | $2.3 \times 10^{10}$ | $3 \times 10^{11}$ | $5.0 \times 10^9$ |
| Volume resistance (ohms-cm) | $6.7 \times 10^2$ | $1.3 \times 10^3$ | $4.0 \times 10^2$ |
| Reflection density | 0.73 | 0.58 | 0.69 |
| Resolution (lines/mm) | 4 | 4 | 4 |

*The stabilizer was a mixture of zinc strarate and calcium stearate.

EXAMPLE 8

| | |
|---|---|
| Cellulose acetate | 100 parts |
| Electrolytic copper powder (average particle diameter 2 microns) | 100 parts |
| Acetone | 500 parts |

The ingredients of the above formulation were sufficiently dispersed. The dispersion was cast on a glass sheet, and acetone was volatilized to afford a metal powder-containing resin sheet having a thickness of $1.8 \times 10^{11}$ ohms, and a volume resistance of $1.3 \times 10^2$ ohms-cm.

| | |
|---|---|
| Vinyl butyral resin (degree of polymerization 1,700; degree of butyralization 66%) | 100 parts |
| Acetylene black | 8 parts |
| Ethyl alcohol | 1000 parts |

The ingredients of the above formulation were sufficiently dispersed. The resulting dispersion was coated on the resulting sheet and dried to form a semiconductive layer having a thickness of 15 microns. Thus, a composite sheet having a total thickness of 30 microns was obtained. The semiconductive layer had a surface resistance of $1.1 \times 10^{11}$ ohms and a volume resistance of $5 \times 10^9$ ohms-cm.

| | |
|---|---|
| Vinyl butyral resin (degree of polymerization 1,700: degree of butyralization 66%) | 100 parts |
| Acetylene black | 30 parts |
| Ethyl alcohol | 1000 parts |

The ingredients of the above formulation were sufficiently dispersed. The dispersion was coated on the semiconductive layer of the composite sheet and dried to form a conductive layer having a thickness of 10 microns. A composite sheet for electric discharge transfer recording having a total thickness of 40 microns was obtained. The conductive layer had a surface resistance of $2 \times 10^3$ ohms and a volume resistance of 2 ohms-cm.

The resulting composite sheet was fed to an automatic electrostencil master sheet processing machine (Gastetner 1100, a trademark for a product of Gestetner Limited). A recording stylus was positioned on the side of the copper powder-containing layer, and plain paper, on the side of the carbon black-containing layer. Electric discharge recording was performed at a scanning density of 6 lines/mm to form a clear image on plain paper. The recorded image had an optical reflection density of 1.15, and a resolution of 6 lines/mm.

Recording was performed ten times using the composite sheet, but no reduction in the clarity of the images was observed. There was scarcely any issuance of an offensive odor, and soot or acetylene black hardly scattered at the time of recording.

The composite sheet was placed on the surface of plain paper, and they were delivered in the same direction at a speed of 60 mm/min. for the plain paper and 6 mm/min. for the composite sheet. Thus, electric discharge transfer recording was performed under the same conditions as described above. A clear image was formed on the plain paper. The recorded image had a reflection density of 0.89 and a resolution of 6 lines/mm. No scattering of soot or acetylene black nor its adhesion to the recording stylus occurred. No penetration hole formed in the composite sheet, either.

The composite sheet and plain paper were positioned so that they crossed each other at right angles and the composite sheet covered the surface of the plain paper at the site of electric discharge transfer recording. They were delivered at a speed of 120 mm/min. for the composite sheet and 60 mm/min. for the plain paper, and electric discharge transfer recording was performed under the same conditions as described above. Electric discharge transfer recording proceeded in good condition without the scattering of soot or acetylene black, its adhesion to the recording stylus, and the formation of penetration holes in the composite sheet. A clear image was formed on the plain paper. The recorded image had a reflection density of 1.05, and a resolution of 6 lines/mm.

EXAMPLE 9

| | |
|---|---|
| Metal powder-containing resin layer | |
| Vinyl acetal resin (degree of polymerization 1,750; degree of acetalization 67%) | 100 parts |
| Electrolytic copper powder (average particle diameter 2 microns) | 160 parts |
| Ethyl alcohol | 1000 parts |
| Semiconductive resin layer | |
| Polyethylene emulsion (solids content 20% by weight; MEIKATEX PEN-O, a trademark for a product of Meisei Chemical Industry Co., Ltd.) | 400 parts |
| Polyvinyl alcohol (degree of saponification 80 mole %) | 20 parts |
| Titanium oxide (rutile type, average particle diameter 0.3 | |

-continued

| | |
|---|---|
| micron) | 100 parts |
| Thermal black | 80 parts |
| Water | 680 parts |
| Conductive resin layer | |
| Polyethylene emulsion | 400 parts |
| Polyvinyl alcohol | 20 parts |
| Acetylene black | 40 parts |
| Water | 680 parts |

In the same way as in Example 8, a composite sheet composed of the metal powder-containing resin layer, the semiconductive resin layer and the conductive layer of the above formulations was produced. The composite sheet for electric discharge transfer recording had a thickness of 40 microns. The thicknesses, surface resistances and volume resistances of the metal powder-containing resin layer, the semiconductive resin layer and a conductive resin layer were as follows:

| | Thickness (microns) | Surface resistance | Volume resistance (ohms-cm) |
|---|---|---|---|
| Metal powder-containing resin layer | 20 | $2 \times 10^{11}$ | $6 \times 10^2$ |
| Semiconductive resin layer | 10 | $1.0 \times 10^{11}$ | $2.6 \times 10^8$ |
| Conductive resin layer | 10 | $2.1 \times 10^3$ | 2.1 |

The composite sheet was fed to a facsimile receiver (PANAFAX 1000D, a trademark for a product of Matsushita Denso Kabushiki Kaisha). A recording stylus was positioned on the side of the copper powder-containing layer, and plain paper, on the side of the carbon black-containing layer. Recording was performed at a scanning density of 4 lines/mm. A clear image was formed on plain paper. The recorded image had a reflection density of 0.68 and a resolution of 4 lines/mm.

EXAMPLE 10

| | |
|---|---|
| Semiconductive resin layer | |
| Vinyl acetal resin (degree of polymerization 1,750; degree of acetalization 67%) | 100 parts |
| Carbon black | shown in Table 2 |
| Filler | shown in Table 2 |
| Ethyl alcohol | 1000 parts |
| Conductive resin layer | |
| Vinyl acetal resin (degree of polymerization 1,750; degree of acetalization 67%) | 100 parts |
| Acetylene black | 60 parts |
| Ethyl alcohol | 1000 parts |

Coating compositions of the above formulations were applied in the same way as in Example 8 to the metal powder-containing resin sheet (thickness 20 microns) prepared in Example 9 to afford composite sheets for electric discharge transfer recording each having a thickness of 40 microns and composed of the metal powder-containing resin layer (thickness 20 microns), the semiconductive resin layer (thickness 10 microns) and the conductive resin layer (thickness 10 microns). The types and amounts of carbon black and the types and amounts of the filler which were used in the semiconductive resin layers, and the surface resistances and volume resistances of the semiconductive resin layers are shown in Table 2. The conductive resin sheet had a surface resistance of $1.8 \times 10^3$ ohms and a volume resistance of 1.2 ohms-cm.

The resulting electric discharge transfer recording sheets were fed into the same facsimile receiver as used in Example 9, and the same automatic electrostencil master processing machine as used in Example 4, and electric discharge recording was performed at a scanning density of 4 lines/min. and 6 lines/min., respectively. Scarcely any offensive odor was issued, and no scattering of soot or carbon black occurred. In each run, a clear image was recorded on plain paper. The reflection densities and resolutions of the recorded images are shown in Table 2.

The results given in Table 2 show that when a fine powdery filler is added to the semiconductive resin layer, the images obtained have an increased reflection density and a higher resolution.

TABLE 2

| | | 1 | 2 | 3 | 4 | 5 | 6 |
|---|---|---|---|---|---|---|---|
| Composition | | | | | | | |
| Acetylene black | | 8 | 6 | — | — | — | — |
| Thermal black | | — | — | 60 | 60 | 60 | 80 |
| Titanium oxide (rutile type, average particle diameter 0.3 micron) | | — | 200 | — | 100 | — | — |
| Precipitated calcium carbonate (average particle diameter 1.7 microns) | | — | — | — | — | 100 | — |
| Whiting (average diameter 1.2 microns) | | — | — | — | — | — | 100 |
| Electrical properties of the semiconductive resin layer | Surface resistance (ohms) | $1.6 \times 10^{11}$ | $1.0 \times 10^{11}$ | $1.4 \times 10^{11}$ | $1.4 \times 10^{11}$ | $1.0 \times 10^{11}$ | $1.2 \times 10^{11}$ |
| | Volume resistance (ohms-cm) | $8.2 \times 10^8$ | $6.0 \times 10^9$ | $1.2 \times 10^9$ | $1.4 \times 10^9$ | $7.3 \times 10^9$ | $6.0 \times 10^9$ |
| Recorded image | | | | | | | |
| Scanning density 4 lines/mm | Reflection density | 0.42 | 0.61 | 0.54 | 0.76 | 0.71 | 0.70 |
| | Resolution (lines/min.) | 2 | 4 | 2 | 3 | 4 | 3 |
| Scanning density 6 lines/mm | Reflection density | 0.75 | 0.95 | 0.81 | 1.18 | 1.10 | 1.15 |
| | Resolution | | | | | | |

TABLE 2-continued

|  | 1 | 2 | 3 | 4 | 5 | 6 |
|---|---|---|---|---|---|---|
| (lines/min.) | 4 | 6 | 4 | 5 | 6 | 5 |

EXAMPLE 11

| Semiconductive resin layer | |
|---|---|
| Vinyl acetal resin (degree of polymerization 1,750; degree of acetalization 67%) | 100 parts |
| Zinc oxide (average particle diameter 0.3 micron; compression strength 50 kg/cm$^2$; specific resistance 10$^4$ ohms-cm) | 300 parts |
| Al-doped conductive zinc oxide (compression strength 50 kg/cm$^2$, specific resistance 10$^4$ ohms-cm, average particle diameter 1.0 micron) | 50 parts |
| Crystal violet | 10 parts |
| Ethyl alcohol | 1000 parts |
| Conductive resin layer | |
| Vinyl acetal resin (degree of polymerization 1,750; degree of acetalization 67%) | 100 parts |
| Silver powder (average particle diameter 0.5 micron) | 250 parts |
| Ethyl alcohol | 1000 parts |

A composite sheet for electric discharge transfer recording having a thickness of 40 microns was prepared from the metal powder-containing resin layer (thickness 20 microns) prepared in Example 10, and the semiconductive resin layer (thickness 10 microns) and the conductive resin layer (thickness 10 microns) of the formulations given above. The semiconductive resin layer had a surface resistance of $2.1 \times 10^{11}$ ohms and a volume resistance of $4.2 \times 10^9$ ohms-cm, and the conductive resin layer had a surface resistance of $1.0 \times 10^3$ ohms and a volume resistance of 1 ohm-cm.

The resulting composite sheet was fed to the same automatic electrostencil master processing machine as used in Example 4, and electric discharge recording was performed at a scanning density of 6 lines/mm. in the same way as in Example 8. A clear blue image was recorded. The recorded image had a reflection density of 1.10 and a resolution of 5 lines/mm.

EXAMPLE 12

| Vinyl butyral resin (degree of polymerization 1,700; degree of butyralization 66%) | 100 parts |
|---|---|
| Silver powder (average particle diameter 0.5 micron) | 210 parts |
| Ethyl alcohol | 1000 parts |

The ingredients of the above formulation were sufficiently dispersed. The dispersion was cast on a glass sheet and dried to obtain a metal-containing resin sheet having a thickness of 30 microns. The resin sheet had a surface resistance of $2.5 \times 10^8$ ohms and a volume resistance of $2.3 \times 10^2$ ohms-cm.

The surface of an electric discharge recording sheet (Tomy Echo, a trademark for a product of Tomoegawa Paper Mfg. Co., Ltd.) was covered with the resin sheet, and recording was performed by a facsimile receiver (PANAFAX 1000 D, a trademark for a product of Matsushita Denso Co., Ltd.). No penetration hole formed on the resin sheet. Scarcely any offensive odor was perceived, and no scattering of soot or carbon black occurred. A recorded image of good quality could thus be obtained. The electric discharge recording sheet had no injury of the scanning track. The recorded image had a reflection density of 0.43, and a resolution of 4 lines/mm.

EXAMPLE 13

| Vinyl butyral resin (degree of polymerization 1,700; degree of butyralization 66%) | 100 parts |
|---|---|
| Molybdenum powder (average particle diameter 5 microns) | 320 parts |
| Ethyl alcohol | 1000 parts |

The ingredients of the above formulation were sufficiently dispersed, and the dispersion was cast on a glass sheet and dried to afford a metal powder-containing resin sheet having a thickness of 30 microns. The resin sheet had a surface resistance of $7.0 \times 10^{11}$ ohms and a volume resistance of $1.1 \times 10^3$ ohms-cm.

The surface of an electric discharge recording sheet (Tomy Echo, a trademark for a product of Tomoegawa Paper Mfg. Co., Ltd.) was covered with the resin sheet, and electric discharge recording was performed in a facsimile receiver (PANAFAX 1000 D, a trademark for a product of Matsushita Denso Kabushiki Kaisha). No penetration hole formed on the resin sheet. Scarcely any offensive odor was perceived, and no scattering of soot or carbon black occurred. A recorded image of very good quality was thus obtained. The electric discharge recording sheet had no injury of the scanning track of the recording stylus. The resulting image had a reflection density of 0.39 and a resolution of 4 lines/mm.

EXAMPLE 14

| Vinyl butyral resin (degree of polymerization 1,700; degree of butyralization 66%) | 100 parts |
|---|---|
| Zinc powder (average particle diameter 4 to 6 microns) | 460 parts |
| Ethyl alcohol | 1000 parts |

The ingredients of the above formulation were thoroughly dispersed. The dispersion was cast on a glass sheet and dried to afford a metal powder-containing resin sheet having a thickness of 30 microns. The resin sheet had a surface resistance of $3.8 \times 10^9$ ohms, and a volume resistance of $6.2 \times 10^2$ ohms-cm.

The surface of an electric discharge recording sheet (Tomy Echo, a trademark for a product of Tomoegawa Paper Mfg. Co., Ltd.) was covered with the resin sheet, and recording was performed in a facsimile receiver (PANAFAX 1000 D, a trademark for a product of Matsushita Denso Kabushiki Kaisha). No penetration hole formed on the resin sheet. Scarcely any offensive odor was perceived, and no scattering of soot or carbon black occurred. A recorded image of very good quality was obtained. The electric discharge recording sheet had no injury from the scanning track of the recording stylus. The resulting image had a reflection density of 0.37 and a resolution of 4 lines/mm.

EXAMPLE 15

| | |
|---|---|
| Vinyl acetal resin (degree of polymerization 1,750; degree of acetalization 67%) | 100 parts |
| Thermal black | 60 parts |
| Titanium oxide (rutile-type, average particle diameter 0.3 micron) | 100 parts |
| Ethyl alcohol | 1000 parts |

The ingredients of the above formulation were sufficiently dispersed. The resulting dispersion was coated on the metal-containing resin sheet prepared in Example 10 to form a semiconductive resin layer having a dry thickness of 10 microns. The semiconductive resin layer had a surface resistance of $1.4 \times 10^{11}$, and a volume resistance of $1.2 \times 10^9$ ohms-cm.

Aluminum was vacuum-deposited on the semiconductive resin layer under a vacuum of $10^5$ torr to form a vacuum-deposited aluminum layer having a thickness of 40 millimicrons and a surface resistance of 2 ohms. Recording was performed in the same way as in Example 9 using the resulting laminated sheet. There was obtained a recorded image which had a reflection density of 0.72 and a resolution of 4 lines/mm.

What we claim is:

1. In a method for electric discharge recording on the recording surface of an electric discharge recording material using a discharge recording stylus, the improvement which comprises interposing between the recording surface and the discharge recording stylus an electrically anisotropic non-recording layer which is unbreakable by electric discharge, comprises a resin matrix and a metal powder dispersed therein, and has a surface resistance of at least $10^8$ ohms and a volume resistance of not more than $10^4$ ohms-cm, whereby said electric discharge recording is carried out through said non-recording layer.

2. The method of claim 1 wherein the metal powder has an average particle diameter of 0.2 to 20 microns.

3. The method of claim 1 wherein the metal powder is in a microspherical, dendric or microlumpy form.

4. The method of claim 1 wherein the metal powder has a specific resistance of not more than $2 \times 10^{-4}$ ohm-cm.

5. The method of claim 1 wherein the metal powder is a powder of a metal selected from the group consisting of copper, aluminum, tin, molybdenum, silver, iron, nickel, zinc and silver-coated copper.

6. The method of claim 1 wherein the metal powder is uniformly dispersed in the resin matrix in an amount of at least 20 parts by weight per 100 parts by weight of the resin.

7. The method of claim 1 wherein the metal powder is uniformly dispersed in the resin matrix in an amount of 30 to 2,000 parts by weight per 100 parts by weight of the resin.

8. The method of claim 1 wherein the metal-containing resin has a surface resistance of $10^9$ to $10^{14}$ ohms.

9. The method of claim 1 wherein the metal-containing resin has a volume resistance of 1 to $10^4$ ohms-cm.

10. The method of claim 1 wherein the non-recording layer has a thickness of 3 to 100 microns.

11. The method of claim 1 wherein the method of electric discharge recording is an electric discharge transfer recording method or an electric discharge breakdown recording method.

12. The method of claim 1 wherein the electric discharge recording is carried out while moving the discharge recording material and the non-recording layer in the same direction at different moving speeds.

13. The method of claim 12 wherein the moving speed of the discharge recording material is higher than that of the non-recording layer.

14. The method of claim 13 wherein the moving speed of the discharge recording material is not more than 1,000 times that of the non-recording layer.

15. The method of claim 1 wherein the electric discharge recording is carried out while moving the discharge recording material and the non-recording layer in different directions.

16. The method of claim 15 wherein the moving direction of the non-recording layer is at right angles to that of the discharge recording material.

* * * * *